Nov. 21, 1939.  S. M. IRVINE  2,181,056
HEDGE SHEARS
Filed July 22, 1938

Inventor
Samuel M. Irvine
By W. H. Wills,
Attorney

Patented Nov. 21, 1939

2,181,056

UNITED STATES PATENT OFFICE 2,181,056

HEDGE SHEARS

Samuel M. Irvine, Great Neck, N. Y., assignor of one-half to Rosa B. Koehler, Great Neck, N. Y.

Application July 22, 1938, Serial No. 220,808

1 Claim. (Cl. 30—271)

This invention relates to cutlery and more particularly hedge shears.

The primary object of this invention resides in the provision of means whereby jar transmitted to the handles of hedge shears during the cutting action thereof will be eliminated.

Another object of this invention resides in the provision of a pair of hedge shears having particularly constructed shock absorbers carried by its blades.

A further object of this invention resides in the provision of a pair of hedge shears adapted to have its handles adjustably connected to its blades.

With these and other objects in view, this invention resides in certain novel features of construction and arrangement of elements to be hereinafter more fully set forth in the specification, illustrated in the accompanying drawing and pointed out in the appended claim and, while the present disclosure depicts my present conception of the invention, the right is reserved to resort to such changes in construction and arrangement of elements as come within the scope of the claim.

Figure 1:
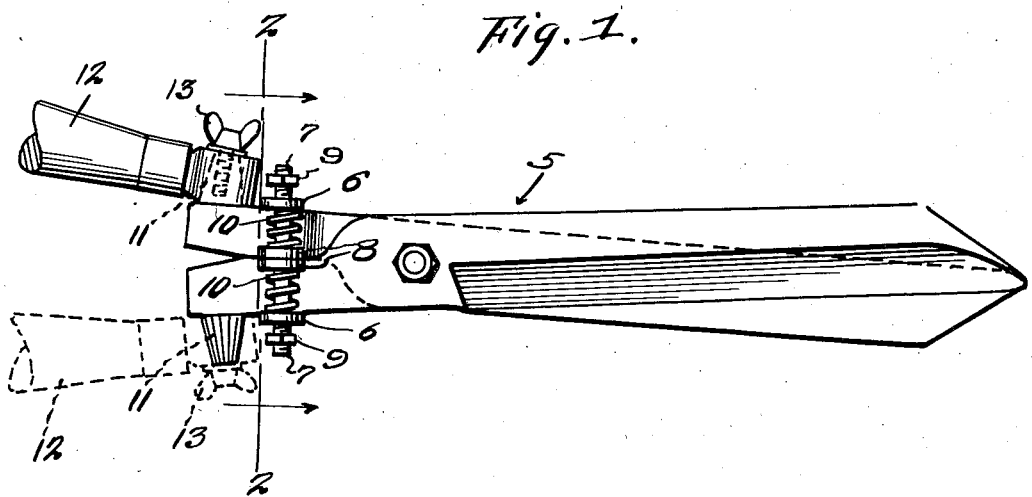
Fig. 1 is a plan view of a pair of hedge shears as constructed in accordance with this invention.
Figure 2:
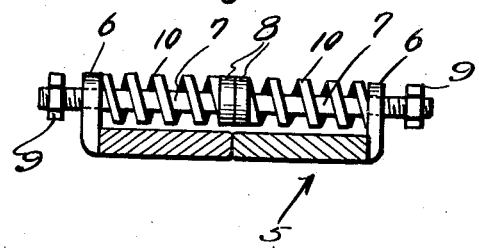
Fig. 2 is an enlarged cross sectional view thereof approximately on line 2—2 of Fig. 1.

In the present illustration of this invention, the numeral 5 designates, in general, a pair of hedge shears of the conventional type having apertured lugs 6 preferably formed on the blades thereof rearwardly of the usual pivotal connection of the same, the apertures in the lugs are disposed in alignment for slidable reception of opposed plungers 7 which are provided with abutting heads 8 on their inner ends and threaded on their outer ends for threadedly accommodating nuts 9 or the like to adjust the tension of springs 10 carried thereon between the heads 8 thereof and the lugs 6 formed on the blades.

Formed on the rear ends of the blades and extending laterally therefrom are roughened lugs 11 adapted to adjustably accommodate the inner apertured ends of handles 12 and, in order to maintain the handles in adjusted position relative to the blades, thumb-screws 13 or the like are threadedly associated with the lugs 11.

While the shock-absorbing elements of this invention are recited as being connected to the blades through instrumentality of the apertured lugs 6 projecting from the edges thereof, the plungers may be assembled to operate within aligned grooves formed in the rear ends of the blades.

Although the springs 10 are recited herein as the cushioning elements rubber sleeves or other similar means may be substituted for the springs.

With this invention fully set forth it is manifest that means are provided to positively eliminate jar to the arms of individuals operating hedge shears and, through the instrumentality of the adjustable handles, the blades of the shears can be rested on the hedge while cutting regardless as to whether or not they are operated by a short or tall person.

Having thus described my invention what I claim and desire to protect by Letters Patent is:

In a pair of shears of the character set forth comprising pivotally connected blades, upwardly disposed apertured lugs formed on the outer edges of the blades rearwardly of their pivotal connection, plungers of lengths greater than half the distance between the lugs when the blades are closed slidably disposed in the apertures of the lugs, opposed heads formed on the inner ends of the plungers in abutting relation when the blades are closed, expansible coil springs on the plungers between the heads thereon and lugs, and means on the free ends of the plungers in spaced relation to the lugs when the blades are closed for adjusting the expansion of the springs.

SAMUEL M. IRVINE.